(12) United States Patent
Kaneko

(10) Patent No.: US 7,171,749 B2
(45) Date of Patent: Feb. 6, 2007

(54) TUBE CONNECTOR FOR FUEL TANK

(75) Inventor: Kenichiro Kaneko, Aichi-ken (JP)

(73) Assignee: Toyoda Gosei Co. Ltd., Aichi-ken (JP)

( * ) Notice: Subject to any disclaimer, the term of this patent is extended or adjusted under 35 U.S.C. 154(b) by 79 days.

(21) Appl. No.: 10/994,527

(22) Filed: Nov. 23, 2004

(65) Prior Publication Data

US 2005/0121105 A1   Jun. 9, 2005

(30) Foreign Application Priority Data

Nov. 26, 2003   (JP) .............................. 2003-394899

(51) Int. Cl.
*B21D 51/16* (2006.01)
*B65B 1/04* (2006.01)
*E03B 11/00* (2006.01)

(52) U.S. Cl. .................... 29/890.12; 141/301; 137/590

(58) Field of Classification Search ............. 29/525.14, 29/890.12; 137/590, 590.5, 592, 587, 588; 141/301

See application file for complete search history.

(56) References Cited

U.S. PATENT DOCUMENTS 5,172,714 A * 12/1992 Kobayashi et al. ........... 137/39
5,660,206 A * 8/1997 Neal et al. .................... 137/592
5,850,851 A * 12/1998 Miura et al. ................. 137/583
6,058,963 A * 5/2000 Enge et al. .................. 137/202
6,189,567 B1 * 2/2001 Foltz ........................... 137/587
6,915,812 B2 * 7/2005 Frohwein ..................... 137/202

FOREIGN PATENT DOCUMENTS

JP   A-H08-216257   8/1996
JP   A-H11-198665   7/1999

* cited by examiner

*Primary Examiner*—John C. Hong
(74) *Attorney, Agent, or Firm*—Posz Law Group, PLC

(57) ABSTRACT

A tube connector 10 of the invention is used for a fuel supply device to feed a supply of fuel to a fuel tank FT. The tube connector 10 is attached to the fuel tank FT and is connected with an inlet hose H, which is fastened by a clamp CP. The tube connector 10 has a connector main body 11 that is attached to the fuel tank FT to surround a tank opening FTa, a reinforcing tube 16 that has a flange 16a and is used to reinforce the connector main body 11, and a conduit formation member 18. The conduit formation member 18 has a fixation end 18b that is welded to a welding element 14f of the connector main body 11 to fix the flange 16b of the reinforcing tube 16. This structure of the tube connector 10 ensures secure and easy fixation of the reinforcing tube 16 to the connector main body 11.

7 Claims, 4 Drawing Sheets

TUBE CONNECTOR FOR FUEL TANK

This application claims the benefit of and priority from Japanese Application No. 2003-394899 filed Nov. 26, 2003, the content of which is incorporated herein by reference.

BACKGROUND OF THE INVENTION

1. Field of the Invention

The present invention relates to a tube connector for a fuel tank, which is used to connect with an inlet hose for a fuel supply to the fuel tank and manufacturing method thereof.

2. Description of the Related Art

Various fuel supply devices have been proposed to be used for a fuel supply to a fuel tank of an automobile (for example, see JP No. 11-198665A and No. 8-216257A). FIG. 7 schematically illustrates the structure of a related art fuel supply device. This related art fuel supply device includes a resin attachment pipe member AP protruded from a fuel tank FT, a filler neck with a fuel cap (not shown), an inlet hose H that is connected with the filler neck and is pressed into the attachment pipe member AP, and a clamp CP that is used to fasten the inlet hose H to the attachment pipe member AP. When the operator removes the fuel cap and feeds a supply of fuel from the filler neck, the flow of fuel runs through the inlet hose H and the attachment pipe member AP to be fed into the fuel tank FT.

Since the inlet hose H is fastened to the attachment pipe member AP by means of the clamp CP, the attachment pipe member AP is reinforced by a reinforcing tube CR to have the enhanced mechanical strength. The reinforcing tube CR has a ring-shaped projection CRa protruded outward and pressed against the inner wall of the attachment pipe member AP. Namely the reinforcing tube CR is fixed to the attachment pipe member AP by means of the elastic force.

In this prior art structure, however, the reinforcing tube CT is fixed to the inner wall of the attachment pipe member AP only by the ring-shaped projection CRa. The reinforcing tube CT is thus readily slipped off the attachment pipe member AP.

SUMMARY OF THE INVENTION

The object of the invention is thus to provide a tube connector for a fuel tank, which has a structure ensuring easy and secure fixation of a reinforcing tube.

In order to attain at least part of the above and the other related objects, the present invention is directed to a tube connector that is used for a fuel supply device to feed a supply of fuel to a fuel tank. The tube connector is attached to the fuel tank and is connected with an inlet hose that is fastened by a clamp. The tube connector includes: a resin connector main body that is attached to the fuel tank to surround a tank opening and has a through hole; a reinforcing tube that has a tubular main body inserted in the through hole to reinforce the connector main body, and a flange formed on one end of the tubular main body; and a conduit formation member that has a conduit formation member main body to define a conduit communicating with a passage of the connector main body, and a fixation end formed on one end of the conduit formation member main body and welded to the connector main body to fix the flange.

In the structure of the tube connector of the invention, the connector main body is attached to the fuel tank to surround the tank opening, while the inlet hose connecting with the tube connector is fastened by the clamp. The supply of fuel flows through the inlet hose and the passage of the tube connector to enter the fuel tank. The tube connector has the reinforcing tube set in the passage of the connector main body. The reinforcing tube enhances the mechanical strength of the resin connector main body and thus effectively prevents any significant shape change of the connector main body when the inlet hose is fastened to the tube connector by the clamp.

The conduit formation member is welded to the connector main body, while the reinforcing tube is set in the through hole of the connector main body. This welding step simultaneously fixes the reinforcing tube at the flange to both the connector main body and the conduit formation member. This facilitates attachment of the reinforcing member. Fixation of the flange of the reinforcing tube by both the conduit formation member and the connector main body effectively prevents a positional shift of the reinforcing tube in the axial direction.

Any of laser welding, heat welding, and ultrasonic welding is applicable to weld the fixation end of the conduit formation member to the connector main body.

In one preferable structure of the tube connector of the invention, the connector main body includes a connector base member that is thermally welded to a periphery of the tank opening to be fixed to the fuel tank, and a connector support member that is integrally made of a resin material having a higher resistance of fuel permeation than that of the connector base member and is reinforced by the reinforcing tube. The connector base member may be made of modified polyethylene, while the connector support member may be made of polyamide.

In another preferable structure of the tube connector of the invention, the conduit formation member has a check valve that prevents a reverse flow of liquid fuel and fuel vapor flowing through the conduit defined by the conduit formation member main body.

DESCRIPTION OF THE PREFERRED EMBODIMENTS

(1) General Structure of Fuel Supply Device FS

Figure 1:
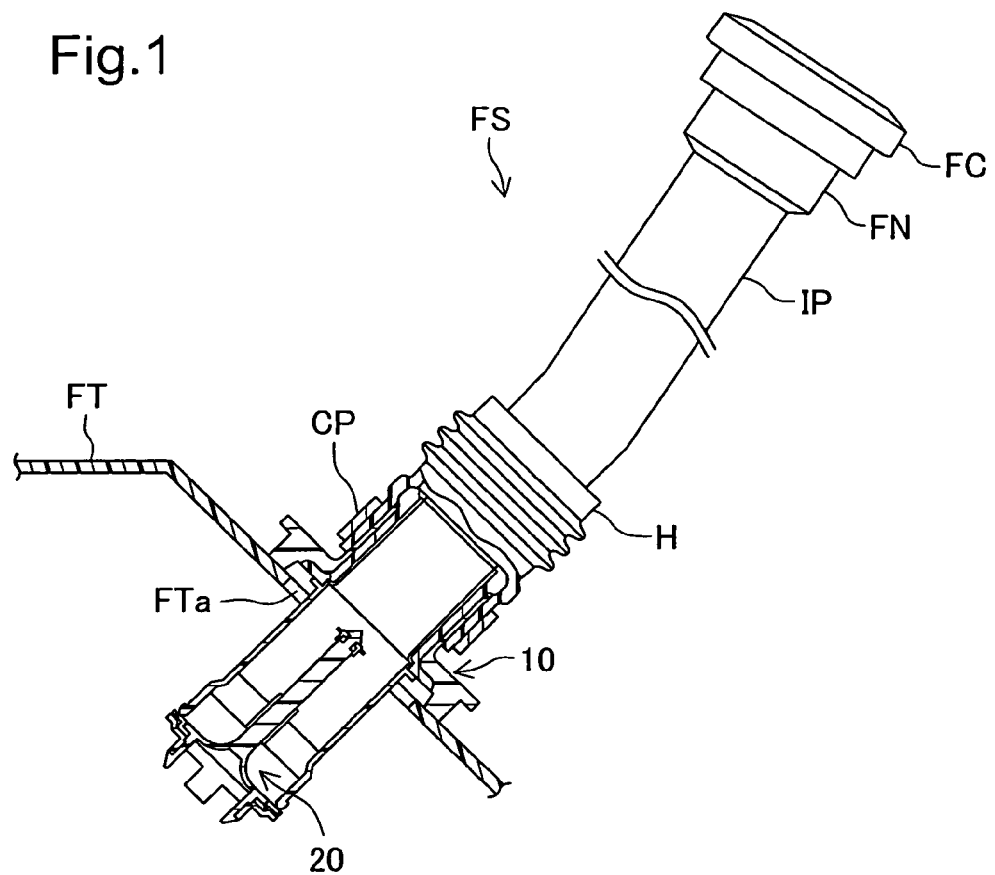
FIG. 1 schematically illustrates the structure of a fuel supply device used to feed a fuel supply to a fuel tank of an automobile.

FIG. 1 schematically illustrates the structure of a fuel supply device FS used to feed a fuel supply to a fuel tank FT of an automobile. As shown in FIG. 1, the fuel supply device FS is connected to the fuel tank FT to feed the supply of fuel from a fuel gun (not shown) into the fuel tank FT. The fuel supply device FS includes a filler neck FN that has an inlet opening opened and closed by a fuel cap FC, an inlet pipe IP that is connected to one end of the filler neck FN and is made of a metal or a resin, a rubber inlet hose H that is connected with the inlet pipe IP, a tube connector 10 that is connected to one end of the inlet hose H and is welded to the fuel tank FT, and a check valve 20 that is attached to the tube connector 10. The inlet hose H is pressed into the tube connector 10 and is fastened by a clamp CP. The filler neck FN has a non-illustrated breather pipe connected to the fuel tank FT. When the operator detaches the fuel cap FC and feeds the supply of fuel from the fuel gun into the filler neck FN, the flow of fuel runs through the inlet pipe IP, the inlet hose H, and the tube connector 10 in the structure of the fuel supply device FS and opens the check valve 20 to be flown into the fuel tank FT.

(2) Structures of Respective Constituents

The structures of the respective constituents are described below.

(2)-1 Fuel Tank FT

The fuel tank FT has multiple resin layers including an ethylene vinyl alcohol copolymer (EVOH) barrier layer of excellent resistance of fuel permeation and a polyethylene (PE) outer layer. A tank opening FTa is formed in an upper portion of the side wall of the fuel tank FT. The tube connector 10 is welded to the fuel tank FT to surround the tank opening FTa.

(2)-2 Tube Connector 10

Figure 2:
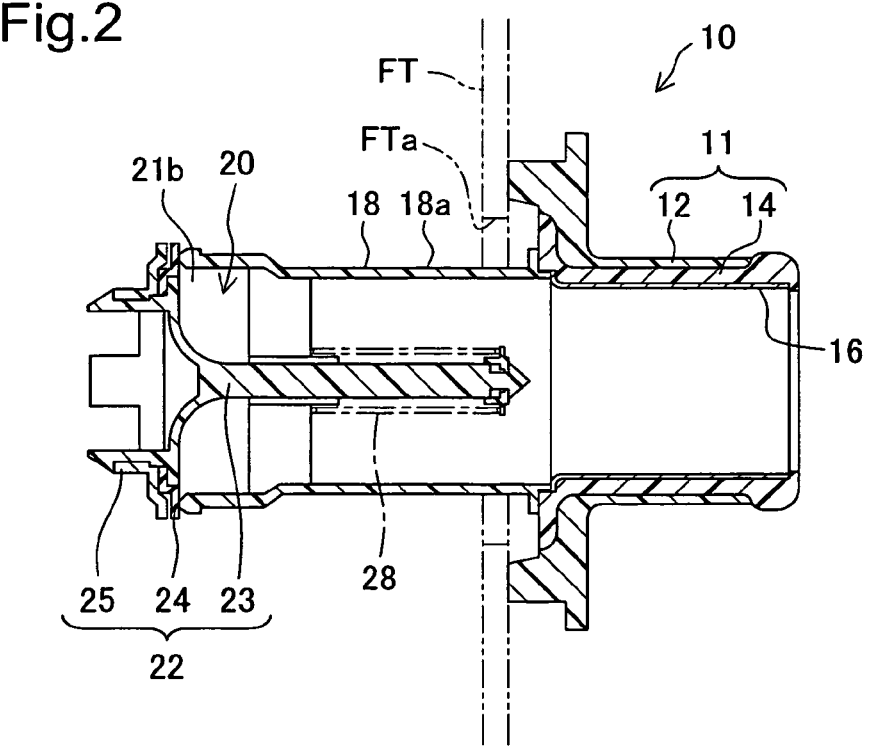
FIG. 2 is an enlarged sectional view showing a tube connector for the fuel tank.

FIG. 2 is an enlarged sectional view showing the tube connector 10 for the fuel tank FT. The tube connector 10 has a connector main body 11, a reinforcing tube 16, and a conduit formation member 18.

(2)-2-1 Connector Main Body 11

Figure 3:
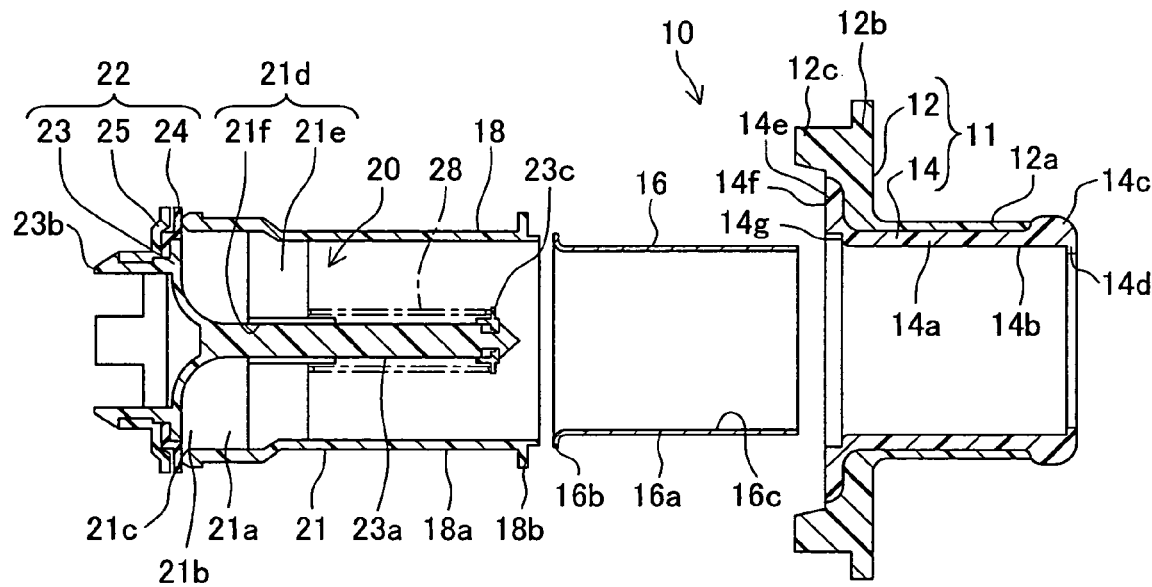
FIG. 3 is a decomposed sectional view showing the tube connector for the fuel tank.
Figure 4:
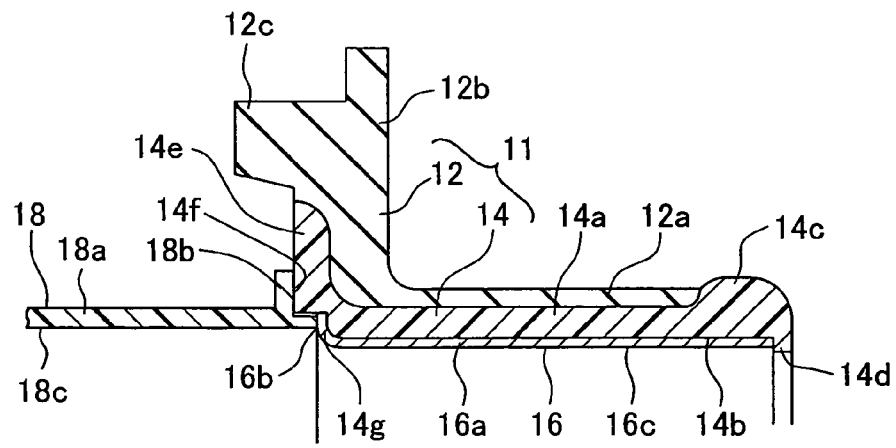
FIG. 4 is an enlarged sectional view showing essential part of the tube connector for the fuel tank.

FIG. 3 is a decomposed sectional view showing the tube connector 10 for the fuel tank. FIG. 4 is an enlarged sectional view showing essential part of the tube connector 10 for the fuel tank. As shown in FIGS. 3 and 4, the connector main body 11 has a connector base member 12 and a connector support member 14, which are integrally formed by co-injection molding.

The connector base member 12 has a cylindrical element 12a, a flange 12b that is extended outward from the outer circumference of one end of the cylindrical element 12a, and a ring-shaped welding end 12c that is protruded from one face of the flange 12b. The connector base member 12 is made of modified polyethylene (hereafter referred to as 'modified PE') to be thermally weldable to the fuel tank FT. The modified PE is a resin material obtained by adding a polar functional group, for example, a maleic acid-modified functional group to polyethylene (PE).

The connector support member 14 is integrated with the inner wall of the connector base member 12 by co-injection molding. The connector support member 14 has a cylindrical element 14a, which defines a through hole 14b therein. One end of the cylindrical element 14a is protruded from its outer circumference to form a retainer element 14c that retains the inlet hose H (see FIG. 1). The inner circumferential edge of the end of the cylindrical element 14a forms a stopper 14d to fix one end of the reinforcing tube 16.

A flange 14e is formed on the other end of the cylindrical element 14a. One face of the flange 14e is welded to the inner wall of the flange 12b of the connector base member 12, while the other face of the flange 14e functions as a welding element 14f, to which the conduit formation member 18 is welded.

The connector support member 14 is made of a resin material that reacts with and is bonded to the modified PE by means of heat in the process of injection molding, for example, polyamide (PA) like nylon-12. The resin material contains 0.1 to 2.0 parts by weight of carbon black for laser welding described later.

(2)-2-2 Reinforcing Tube 16

The reinforcing tube 16 is used to mechanically reinforce the connector main body 11 and is fitted in the through hole 14b of the connector support member 14. The reinforcing tube 16 includes a tubular main body 16a and a flange 16b that is formed on one end of the tubular main body 16a. The tubular main body 16a has an inner passage 16c linked to the inlet hose H. The flange 16b is an end portion for fixing the reinforcing tube 16 to the connector main body 11 with one end of the conduit formation member 18 as described later.

The reinforcing tube 16 is manufactured by cutting an iron pipe or a stainless steel pipe at a preset length and pressing one end of the cut pipe to form the flange 16b.

(2)-2-3 Conduit Formation Member 18

The conduit formation member 18 is welded to and integrated with the welding element 14f of the connector support member 14 to form a flow path. The conduit formation member 18 includes a conduit formation member main body 18a and a fixation projection 18b that is protruded from one end of the conduit formation member main body 18a. The conduit formation member main body 18a forms a conduit 18c that communicates with the passage 16c.

The fixation element 18b is a ring-shaped step to be positioned relative to the welding element 14f. The fixation element 18b is welded to the welding element 14f of the connector support member 14 and holds the flange 16b of the reinforcing tube 16 to fix the reinforcing tube 16.

The conduit formation member 18 is made of the same material as that of the connector support member 14, for example, PA.

(2)-3 Manufacture of Tube Connector 10 for Fuel Tank

The tube connector 10 for the fuel tank FT is manufactured by the following procedure.

(2)-3-1 Manufacturing Process of Connector Main Body 11

The connector main body 11 is manufactured by co-injection molding of the connector base member 12 and the connector support member 14. The connector base member 12 is made of the modified PE, while the connector support member 14 is made of the resin material containing PA of high mechanical strength and 0.1 to 2.0 parts by weight of carbon black for absorption of laser beam.

The PA material of the connector support member 14 reacts with and is bonded to the modified PE with addition of the maleic acid-modified polar functional group of the connector base member 12 by means of heat in the process of injection molding. The connector base member 12 and the connector support member 14 are thus securely integrated with each other by co-injection molding.

(2)-3-2 Attachment of Reinforcing Tube 16 and Conduit Formation Member 18

The reinforcing tube 16 is inserted into the through hole 14b of the connector support member 14. One end of the reinforcing tube 16 is positioned by the stopper 14d of the connector support member 14, while the flange 16b on the other end of the reinforcing tube 16 is positioned by an opening periphery 14g of the connector support member 14.

The injection-molded PA conduit formation member 18 is then welded to the connector support member 14. More specifically the fixation element 18b of the conduit formation member 18 is laser welded to the welding element 14f of the connector support member 14.

Figure 5:
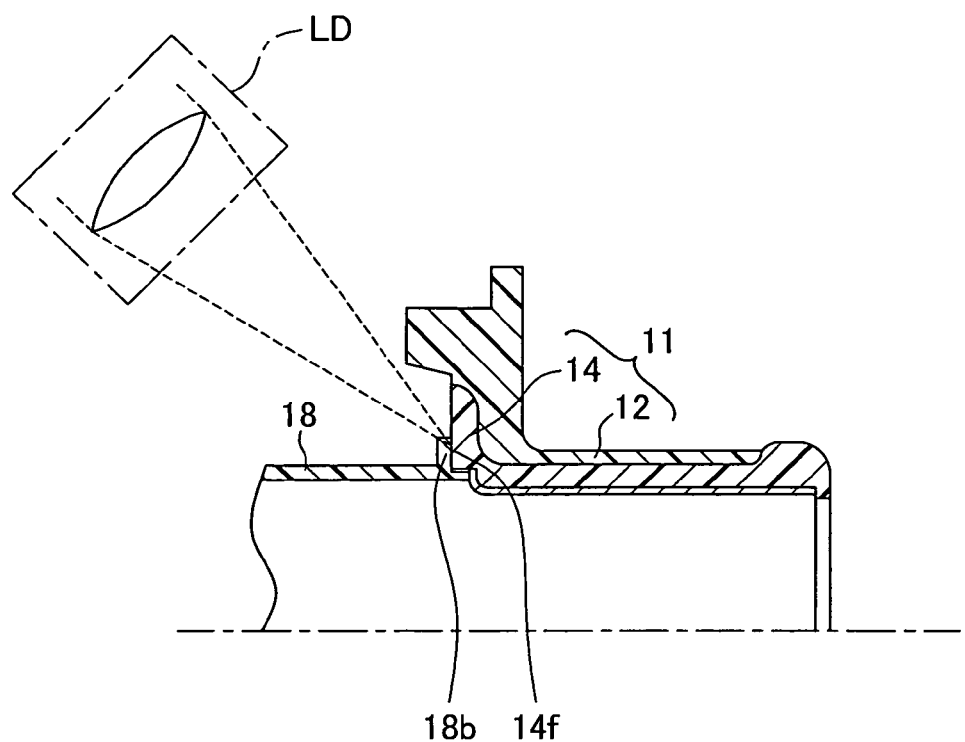
FIG. 5 shows a laser welding process with a laser irradiation device.

FIG. 5 shows a laser welding process with a laser irradiation device LD. The process of thermally welding the conduit formation member 18 to the connector support member 14 first holds both ends of the semi-assembled tube connector 10 which corporates the conduit formation member 18 to the semi-assembled tube connector 10 with a chuck working with a rotary driving unit and emits laser beams from the laser irradiation device LD, which is rotated by the rotary driving unit. The laser beams are emitted from the laser irradiation device LD of semiconductor laser or YAG laser as a light source and have any of diverse wavelengths in far-infrared and near-infrared regions and visible region. The laser beams may be emitted from multiple light sources or may otherwise be emitted from one single light source and subsequently be divided by optical fibers.

The laser beams emitted from the laser irradiation device LD pass through the fixation element 18b of the conduit formation member 18 and hit against the flat face of the welding element 14f of the connector support member 14. As the resin material of the connector support member 14 contains 0.1 to 2.0 parts by weight of carbon black, the laser beams are absorbed by the connector support member 14 to melt both the welding element 14f of the connector support member 14 and the fixation element 18b of the conduit formation member 18. The melted resin material of the welding element 14f mixes with the melted same PA material of the fixation element 18b. The melted mixture is cooled down and cured to weld the conduit formation member 18 to the connector support member 14.

(2)-4 Check Valve 20

(2)-4-1 Structure of Check Valve 20

Referring back to FIG. 2, the check valve 20 mainly includes a housing 21, which forms part of the conduit formation member main body 18a of the conduit formation member 18 and has a valve chest 21a, a valve plug 22, and a spring 28. An outlet 21b on one end of the housing 21 is opened and closed by the valve plug 22.

In FIG. 3, the valve plug 22 has a valve support element 23 with a support rod 23a, a rubber seat element 24, and a plate 25 functioning to attach the seat element 24 to the valve support element 23. The seat element 24 is seated on and separated from a seating face 21c of the outlet 21b and is fixed to the valve support element 23 via the plate 25, which is caught by a claw 23b of the valve support element 23.

The support rod 23a of the valve plug 22 is held by a valve holding element 21d of the housing 21 to be movable in an axial direction. The valve holding element 21d of the housing 21 has a joint element 21e to hold the valve plug 22 in the valve chest 21a of the housing 21. The support rod 23a of the valve plug 22 passes through a valve support aperture 21f formed in a center portion of the joint element 21e, so that the valve plug 22 is supported to be movable relative to the housing 21.

The spring 28 pressing the valve plug 22 in a valve-closing direction is placed on the support rod 23a and is spanned between a spring stopper 23c fixed to one end of the support rod 23a and the valve holding element 21d.

(2)-4-2 Operations of Check Valve 20

The check valve 20 in the closed position prevents the liquid fuel and the fuel vapor in the fuel tank FT from being released to the outside through the inlet hose H and the inlet pipe IP. The supply of fuel fed through the inlet pipe IP, the inlet hose H, and the tube connector 10 runs through the flow path of the tube connector 10 and the valve chest 21a of the check valve 20 to reach the valve plug 22. When the flow force of the fuel applied onto the valve plug 22 exceeds the pressing force of the spring 28, the valve plug 22 opens the outlet 21b of the housing 21 to make the flow of fuel enter the fuel tank FT.

(3)-1 Attachment to Fuel Tank FT

In order to fixed the tube connector 10 to the fuel tank FT as shown in FIG. 1, the ring-shaped welding end 12c of the connector main body 11 and the periphery of the tank opening FTa of the fuel tank FT are melted by a hot plate, and the welding end 12c is pressed against the periphery of the tank opening FTa. As the outer layer of the fuel tank FT is made of the PE material, the welding end 12c made of the modified PE is thermally welded to the periphery of the tank opening FTa. The inlet hose H is pressed into the connector main body 11 of the tube connector 10 and is fastened to the connector main body 11 by the clamp CP. The inlet hose H is accordingly linked to the tube connector 10.

(4) Effects and Functions of Embodiment

The structure of the above embodiment has the following effects, in addition to those described above.

(4)-1 Since the reinforcing tube 16 is placed in the connector main body 11 of the tube connector 10 for the fuel tank FT to enhance the mechanical strength of the resin connector main body 11, the reinforcing tube 16 effectively prevents any significant shape change of the connector main body 11 when the inlet hose H is fastened to the connector main body 11 by the clamp CP.

(4)-2 The conduit formation member 18 is welded to the connector support member 14 after the reinforcing tube 16 is set in the through hole 14b of the connector main body 11. Since this welding step simultaneously fixes the reinforcing tube 16 at the flange 16b to both the connector support member 14 and the conduit formation member 18, the step facilitates attachment of the reinforcing tube 16. Since one end of the reinforcing tube 16 is retained by the stopper 14d, while the flange 16b of the reinforcing tube 16 is clamped between the conduit formation member 18 and the connector support member 14, fixation of the reinforcing tube 16 on both ends thereof effectively prevents a positional shift of the reinforcing tube 16 in the axial direction.

(4)-3 Since the connector main body 11 is formed by integrating the connector base member 12 that is welded to the fuel tank FT with the connector support member 14 that has the high mechanical strength, this integrated structure desirably enhances attachment of the connector main body 11 to the fuel tank FT and the support strength of the connector main body 11 for supporting the inlet hose H.

Figure 6:
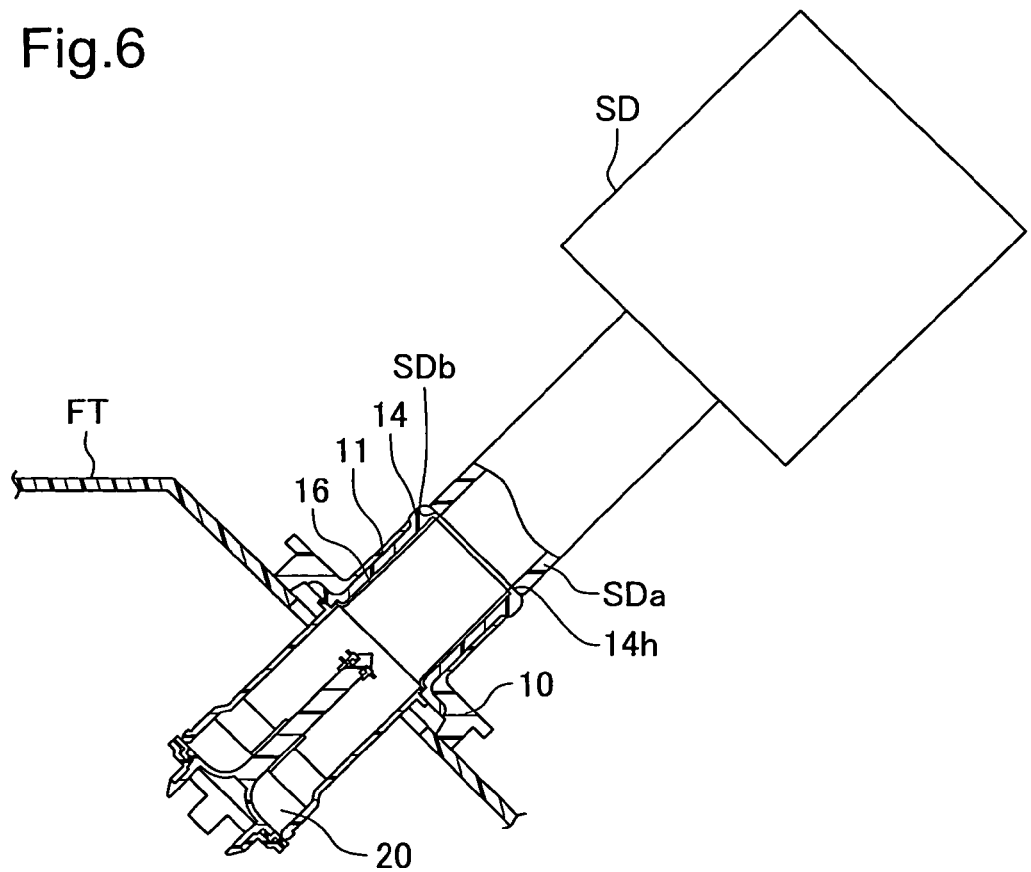
FIG. 6 shows a method of measuring the sealing property of the fuel tank with a seal tester.
Figure 7:
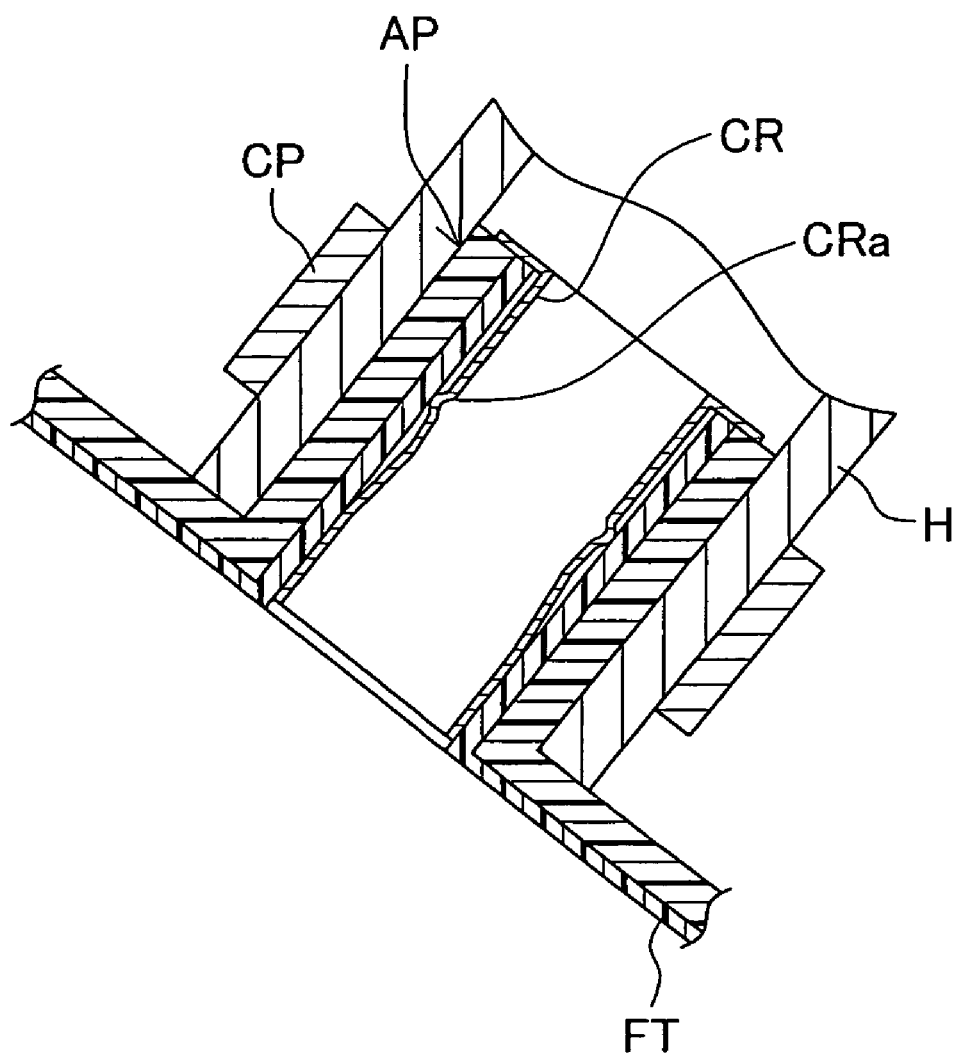
FIG. 7 illustrates the structure of a related art fuel supply device.

(4)-4 FIG. 6 shows a method of measuring the sealing property of the fuel tank FT with a seal tester SD. The sealing property of the fuel tank FT is readily measured by utilizing the flat plane of an end face 14h of the connector main body 11. The measurement of the sealing property of the fuel tank FT places an end face SDb of a pressure pipe SDa of the seal tester SD as a compressed gas supply source at the flat end face 14h of the connector support member 14, supplies the compressed gas into the fuel tank FT, and measures the state of pressure reduction. Since the flat end face 14h of the connector support member 14 ensures the high sealing property when being pressed against the end face SDb of the pressure pipe SDa, the sealing property of the fuel tank FT is readily tested without pressing the pressure pipe SDa into the connector main body 11.

The embodiment discussed above is to be considered in all aspects as illustrative and not restrictive. There may be many modifications, changes, and alterations without departing from the scope or spirit of the main characteristics of the present invention. Some examples of possible modification are given below.

(1) In the structure of the embodiment, the connector main body 11 is manufactured by co-injection molding of the connector base member 12 and the connector support member 14. The connector main body 11 may otherwise be made integrally of an identical resin material.

(2) In the structure of the embodiment, the check valve 20 is placed in the conduit formation member 18. The tube connector may not include the check valve 20 but has only a piping structure assembled to adjust the full level of the fuel tank FT.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A tube connector that is used for a fuel supply device to feed a supply of fuel to a fuel tank, the tube connector being attached to the fuel tank and being connected with an inlet hose that is fastened by a clamp, the tube connector comprising:
    a resin connector main body that is attached to the fuel tank to surround a tank opening, wherein the resin connector main body has a through hole;
    a reinforcing tube that has a tubular main body, which is inserted in the through hole to reinforce the connector main body, and a flange, which is formed on an end of the tubular main body; and
    a conduit formation member, which has a conduit formation member main body to define a conduit communicating with a passage of the connector main body, and a fixation end, which is formed on an end of the conduit formation member main body and welded to the connector main body to fix the flange,
    wherein the connector main body includes a connector base member, which is thermally welded to a periphery of the tank opening to be fixed to the fuel tank, and a connector support member, which is integrally made of a resin material having a higher resistance of fuel permeation than that of the connector base member and is reinforced by the reinforcing tube.

2. The tube connector in accordance with claim 1, wherein the connector base member is made of modified polyethylene obtained by adding a polar functional group, and the connector support member is made of a resin material including polyamide.

3. The tube connector in accordance with claim 2, wherein the resin material of the connector support member contains 0.1 to 2.0 parts by weight of carbon black for laser welding.

4. The tube connector in accordance with claim 1, wherein the conduit formation member comprises a check valve that prevents a reverse flow of liquid fuel and fuel vapor flowing from fuel tank to the passage of the connector main body.

5. The tube connector in accordance with claim 1, wherein an inner wall at one end of the connector support member includes a stopper, wherein the stopper fixes an end of the reinforcing tube that is opposite to the flange.

6. The tube connector in accordance with claim 1, wherein the resin connector main body includes a flat end face, the end face being configured to ensure tight sealing property when the end face is pressed against an end face of a pressure pipe of a compressed gas supply source, and a compressed gas is supplied from the compressed gas supply source to the passage of the resin connector main body.

7. A tube connector that is used for a fuel supply device to feed a supply of fuel to a fuel tank, the tube connector being attached to the fuel tank and being connected with an inlet hose that is fastened by a clamp, the tube connector comprising:
    a resin connector main body that is attached to the fuel tank to surround a tank opening, wherein the resin connector main body has a through hole;
    a reinforcing tube that has a tubular main body, which is inserted in the through hole, and a flange, which is formed on an end of the tubular main body, wherein the reinforcing tube fits an inner wall of the through hole to reinforce the connector main body; and
    a conduit formation member, which has a conduit formation member main body to define a conduit communicating with a passage of the connector main body, and a fixation end, which is formed on an end of the conduit formation member main body, wherein the fixation end holds the flange to an end of the resin connector main body and is welded to the end of the connector main body to fix the reinforcing tube.

* * * * *